United States Patent
DiMaria (10) Patent No.: US 12,243,528 B2
(45) Date of Patent: *Mar. 4, 2025

(54) PROTECTION AGAINST VOICE MISAPPROPRIATION IN A VOICE INTERACTION SYSTEM

(71) Applicant: BANK OF AMERICA CORPORATION, Charlotte, NC (US)

(72) Inventor: Steven Mark DiMaria, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,542

(22) Filed: Oct. 27, 2023

(65) Prior Publication Data
US 2024/0055001 A1    Feb. 15, 2024

Related U.S. Application Data

(63) Continuation of application No. 17/372,994, filed on Jul. 12, 2021, now Pat. No. 11,881,218.

(51) Int. Cl.
*G10L 15/22* (2006.01)
*G10L 15/08* (2006.01)
*H04Q 9/00* (2006.01)

(52) U.S. Cl.
CPC .............. *G10L 15/22* (2013.01); *G10L 15/08* (2013.01); *H04Q 9/00* (2013.01)

(58) Field of Classification Search
CPC ............ G10L 15/22; G10L 15/08; H04Q 9/00
See application file for complete search history.

(56) References Cited

U.S. PATENT DOCUMENTS

| | | |
|---|---|---|
| 10,141,007 B1 | 11/2018 | Kim et al. |
| 10,436,631 B2 | 10/2019 | Lee et al. |
| 10,672,402 B2 | 6/2020 | De et al. |
| 2004/0075363 A1 | 4/2004 | Malkin et al. |
| 2015/0185764 A1 | 7/2015 | Magi |
| 2017/0358317 A1 | 12/2017 | James |
| 2018/0084341 A1 | 3/2018 | Cordourier Maruri et al. |
| 2018/0182393 A1 | 6/2018 | Shim et al. |
| 2018/0293367 A1 | 10/2018 | Urman |

(Continued)

OTHER PUBLICATIONS

Sugawara, Takeshi, et al. "Light commands: laser-based audio injection attacks on voice-controllable systems." Proceedings of the 29th USENIX Conference on Security Symposium. 2020. (Year: 2020).

(Continued)

*Primary Examiner* — Brian L Albertalli
(74) *Attorney, Agent, or Firm* — Moore & Van Allen PLLC; Nicholas C. Russell (57) ABSTRACT

Prevention of voice misappropriation in voice interaction/response systems. The system relies on telemetry data, including thermal data of components to determine whether a received voice command was made by actual voice. If the voice command is determined to have been made by an actual voice, a response to the command is generated and transmitted, otherwise if the voice command is determined to have likely not been made by an actual voice (e.g., artificial means replicating a voice, such as a laser or the like), no response to the command is transmitted or action taken with respect to the command.

20 Claims, 5 Drawing Sheets

(56) References Cited

U.S. PATENT DOCUMENTS

| | | |
|---|---|---|
| 2018/0324530 A1 | 11/2018 | Hoskins et al. |
| 2020/0243067 A1 | 7/2020 | Maziewski et al. |
| 2021/0335383 A1 | 10/2021 | John et al. |
| 2021/0356387 A1 | 11/2021 | Temerowski, II et al. |
| 2021/0390960 A1 | 12/2021 | Lesso |
| 2022/0036365 A1 | 2/2022 | Lenke |
| 2022/0205663 A1 | 6/2022 | Bondalapati et al. |
| 2022/0351745 A1 | 11/2022 | Iyer et al. |

OTHER PUBLICATIONS

Feng, Huan, Kassem Fawaz, and Kang G. Shin. "Continuous authentication for voice assistants." Proceedings of the 23rd Annual International Conference on Mobile Computing and Networking. 2017. (Year: 2017).

Sikder, Amit Kumar, Hidayet Aksu, and A. Selcuk Uluagac. "6thSense: A Context-aware Sensor-based Attack Detector for Smart Devices." USENIX Security Symposium. 2017. (Year: 2017).

PROTECTION AGAINST VOICE MISAPPROPRIATION IN A VOICE INTERACTION SYSTEM

CROSS-REFERENCE TO RELATED APPLICATIONS

This application is a continuation application of and claims priority to U.S. patent application Ser. No. 17/372,994 filed on Jul. 12, 2021, and of the same title; the contents of which are also incorporated herein by reference.

FIELD OF THE INVENTION

The present invention is generally directed to computing device security and, more specifically, providing protection against voice misappropriation in a voice interaction/response system.

BACKGROUND

Many voice interaction/response systems are currently in use which allow for a user to authenticate by means of their voice signature and perform various actions based on voice commands. For example, voice interaction/response systems are currently used to perform purchase transactions and conduct conventional financial institution transactions (e.g., transfers between accounts and the like).

While biometric data in the form of a voice signature appears to be a secure means for authentication, nefarious entities are constantly working to devise ways to circumvent any such technological advancements. In this regard, it may be possible to misappropriate a user's voice signature by providing inputs to a voice interaction/response system that replicate a user's voice. For example, studies have shown that laser power frequency can be used to approximate different voices Therefore, a need exists to develop systems, methods, computer program products and that like that insures that a voice command made to a voice interaction/response system, is in fact, an actual voice and not some other means used to replicate a voice. The determination of whether a voice command is an actual voice should be made in real-time, prior to or while the voice interaction/system is processing the voice command, so that minimal to no delay exists in responding to voice commands determined to made by actual voices. As result, the desired systems, methods, computer program products and the like should prevent misappropriation of a voice by identifying those inputs that are not actual voices and taking appropriate action.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for protection against misappropriation of a voice in a voice interaction/response system. In this regard, the present invention is able to determine whether a voice input/command is an actual voice or is likely to be something other than an actual voice.

The present invention relies on the assumption that when actual voice inputs are received by a device, the telemetry of the device behaves according to a known baseline and when inputs are received that attempt to replicate a voice the telemetry of the device will differ from the known baseline. For example, for laser power frequency to be used to replicate different voices the devices internal telemetry regarding heat must change to create the pressure fluctuations needed to approximate the voice signals or to interface directly with processing devices.

Therefore, according to embodiments of the present invention, when a voice command is received by a user device, the device compiles telemetry data and transmits the telemetry data, along with the digital signal that includes the voice command, to the voice interaction/response system. In turn, the voice interaction/response system, makes a determination, based on the received telemetry data, as to whether the received voice command is an actual voice input. The telemetry data may include thermal data associated with one or more components of the user device, such as the processing device(s) or the like. In other embodiments of the invention, the telemetry data may include other informative data such as, but not limited to, (i) power consumption data of one or more components, (ii) touch panel input data of one or more touch panels (iii) motion amount data or motion pattern data of one or more diaphragms of one or more microphones, (iv) geo-physical location of the user device, (vi) MAC address of the user device, and (vii) time at which the perceived voice command was received at the device.

In specific embodiments of the invention, a machine learning model is developed that renders baseline telemetry data for the user device based on continual/ongoing receipt of telemetry data from the device during voice response requests. In such embodiments of the invention, when the voice interaction/response system receives a voice command and telemetry data, the telemetry data is compared to the baseline telemetry data of the machine learning model to determine the differences therebetween. In specific embodiments of the invention, the comparison results in determination of a telemetry score that indicates a level of difference between the received telemetry data and the baseline telemetry data. In such embodiments of the invention, if the telemetry score meets or is below a threshold level telemetry score, the voice command is deemed to be actual voice and the system provides a response to the command. Alternatively, if the telemetry score meets or exceeds the threshold level telemetry score, the voice command is deemed to likely not be an actual voice and actions/inactions other than providing a response are taken (e.g., an error message is provided or no response is made).

Thus, the present invention is able to determine, in real-time while a voice command is being processed, whether the voice command is coming from an actual voice and, if it is determined to likely not be from an actual voice, ignore the voice command or perform other actions that avert voice misappropriation. As a result, the present invention prevents wrongdoers from performing nefarious actions in the event that the wrongdoers are attempting to artificially replicate a user's voice in a voice interaction/response system.

A system for protection against voice misappropriation in a voice interaction system defines first embodiments of the invention. The system includes a user computing platform having a first memory, one or more first processing devices in communication with the first memory and at least one microphone in communication with the at least one of the first processing devices. The first memory stores first instructions that are executable by the one or more first processing devices. The first instructions are configured to receive a perceived voice command, and, in response to receiving the perceived voice command, compile telemetry data that indicates a current operating state of the user computing platform. Further, the first instructions are configured to transmit a digital signal representing the perceived voice command and the telemetry data to the voice interaction system.

The system additionally includes a voice interaction computing platform including a second memory and one or more second processing devices in communication with the second memory. The second memory stores second instructions that are included within the voice interaction system, and executable by the one or more second processing devices. The second instructions are configured to receive, from the user computing platform, the digital signal and the telemetry data and determine, based on the telemetry data, whether the perceived voice command is an actual voice command originating from a voice of a user. Further, the second instructions are configured to, in response to determining that the perceived voice command input is the actual voice command (i) generate a response to a command identified from the digital signal, and (ii) transmit the response to the user computing platform. The second instructions are further configured to, in response to determining that the perceived voice command is likely not the actual voice command, perform an action chosen from the group consisting of (i) generate and transmit an error response to the user computing platform, and (ii) refrain from generating a response to the perceived voice command.

In specific embodiments of the system, the telemetry data includes thermal data of one or more components of the user computing platform. In specific embodiments of the system, the thermal data is the sole determining factor in determining whether the perceived voice command is an actual voice command originating from a voice of a user. In other embodiments of the system the telemetry data used to determine whether the perceived voice command is an actual voice command includes, in addition to the thermal data, one or more of (i) power consumption data of one or more components of the user computing platform, (ii) touch panel input data of one or more touch panels of the user computing platform, (iii) motion amount data or motion pattern data of one or more diaphragms of the at least one microphone of the user computing platform, (iv) location of the user computing platform, (vi) MAC address of the user device, and (vii) time at which the perceived voice command was received at the device.

In further specific embodiments of the system, the second computing platform, or some other computing platform, further includes third instructions that are executable by the one or more second processing devices. The third instructions are configured to develop a machine learning model that determines baseline telemetry data for the user computing platform based on ongoing receipt of telemetry data from the user computing platform. In such embodiments of the system, the second instructions are configured to determine whether the perceived voice command is an actual voice command originating from a voice of a user by (i) compare the received telemetry data to the baseline telemetry data determined from machine learning model, (ii) based on the comparison, determine a telemetry score that indicates a level of difference between the received telemetry data and the baseline telemetry data, and (iii) in response to determining that the telemetry score meets or is below a predetermined threshold, identify the perceived voice command as the actual voice command. Moreover, in additional specific embodiments, the second instructions are configured to, in response to determining that the telemetry score exceeds the predetermined threshold, identify the perceived voice command as likely not an actual voice command.

A computer-implemented method for protection against voice misappropriation in a voice interaction system defines second embodiments of the invention. The computer-implemented method is executable by one or more computing processor devices. The method includes receiving, from a user device, (i) a digital signal representing a perceived voice command received at user device and (ii) telemetry data compiled in response to receiving the perceived voice command, wherein the telemetry data indicates a current operating state of the user device. In addition, the method includes determining, based on the telemetry data, whether the perceived voice command is an actual voice command originating from a voice of a user. In response to determining that the perceived voice command input is the actual voice command the method further includes (ii) generating a response to a command identified from the digital signal, and (ii) transmitting the response to the user device. Alternatively, in response to determining that the perceived voice command is likely not the actual voice command, the method includes performing an action chosen from the group consisting of (a) generating and transmitting an error response to the user device, and (b) refraining from generating a response to the perceived voice command.

In specific embodiments of the method, receiving the telemetry data further comprises receiving telemetry data including thermal data of one or more components of the user computing platform. In specific embodiments of the method, determining whether the perceived voice command is an actual voice command originating from a voice of a user is based solely on the thermal data. In other specific embodiments of the method, receiving the telemetry data further comprises receiving telemetry data including one or more of (i) power consumption data of one or more components of the user device, (ii) touch panel input data of one or more touch panels of the user device, (iii) motion amount data or motion pattern data of one or more diaphragms of the at least one microphone of the user device, (iv) location of the user device, (v) MAC address of the user device, and (vii) time at which the perceived voice command was received at the device. In specific embodiments of the invention, determining whether the perceived voice command is an actual voice command originating from a voice of a user is based on the thermal data and one or more of (i)-(vii).

In still further specific embodiments of the method, determining, based on the telemetry data, whether the perceived voice command is an actual voice command originating from a voice of a user further includes (i) developing a machine learning model that determines baseline telemetry data for the user computing platform based on ongoing receipt of telemetry data from the user computing platform, (ii) comparing the received telemetry data to the baseline telemetry data determined from machine learning mode, (iii) based on the comparison, determining a telemetry score that indicates a level of difference between the received telemetry data and the baseline telemetry data, and (iv) in response to determining that the telemetry score meets or is below a predetermined threshold, identifying the perceived voice command as the actual voice command, or in response to determining that the telemetry score exceeds the predetermined threshold, identifying the perceived voice command as likely not the actual voice command.

A computer program product including a non-transitory computer-readable medium defines third embodiments of the invention. The non-transitory computer-readable medium includes a first set of codes for causing a computer to receive, from a user device, (i) a digital signal representing a perceived voice command received at user device and (ii) telemetry data compiled in response to receiving the perceived voice command, wherein the telemetry data indicates a current operating state of the user device. Additionally, the computer-readable medium includes a second set of codes for causing a computer to determine, based on the telemetry data, whether the perceived voice command is an actual voice command originating from a voice of a user. In addition, the computer-readable medium includes a third set of codes for causing a computer to (1) in response to determining that the perceived voice command input is the actual voice command (i) generate a response to a command identified in the digital signal, and (ii) transmit the response to the user device, or (2) in response to determining that the perceived voice command is likely not the actual voice command, perform an action chosen from the group consisting of (a) generate and transmit an error response to the user device, and (b) refrain from generating a response to the perceived voice command.

In specific embodiments of the computer program product, the first set of codes is further configured to receive the telemetry data including thermal data of one or more components of the user computing platform. In specific embodiments of the computer program product the second set of codes are further configured to cause the computer to determine whether the perceived voice command is an actual voice command based solely on the thermal data. In other specific embodiments of the computer program product, the first set of codes is further configured to receive the telemetry data including one or more of (i) power consumption data of one or more components of the user device, (ii) touch panel input data of one or more touch panels of the user device, (iii) motion amount data or motion pattern data of one or more diaphragms of the at least one microphone of the user device, (iv) location of the user device, (v) MAC address of the user device, and (vii) time at which the perceived voice command was received at the device. In such embodiments of the computer program product, the second set of codes are further configured to cause the computer to determine whether the perceived voice command is an actual voice command based on the thermal data and one or more of (i) (vii).

In further specific embodiments of the computer program product, the second set of codes is further configured to determine, based on the telemetry data, whether the perceived voice command is an actual voice command originating from a voice of a user by (i) developing a machine learning model that determines baseline telemetry data for the user computing platform based on ongoing receipt of telemetry data from the user computing platform, (ii) comparing the received telemetry data to the baseline telemetry data determined from machine learning model, (iii) based on the comparison, determining a telemetry score that indicates a level of difference between the received telemetry data and the baseline telemetry data, and (iv) in response to determining that the telemetry score meets or is below a predetermined threshold, identifying the perceived voice command as the actual voice command, or in response to determining that the telemetry score exceeds the predetermined threshold, identifying the perceived voice command as likely not the actual voice command.

Thus, according to embodiments of the invention, which will be discussed in greater detail below, the present invention addresses needs and/or achieves other advantages by providing for protection against misappropriation of voice in a voice interaction/response system. In this regard, the present invention is able to determine whether a voice input/command is an actual voice or is likely to be something other than an actual voice (e.g., a laser or other mechanism used to replicate a voice). The invention relies on telemetry data compiled at the time a voice command is received to determine whether the command is coming from an actual voice. The determination is made by comparing the telemetry data to known baseline telemetry of the device to determine the level difference therebetween. In the event the voice command is determined to be coming from something other than an actual voice, appropriate actions, or inactions (e.g., failure to respond) are taken.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide protection against misappropriation of voice in a voice interaction/response system. In this regard, the present invention is able to determine whether a voice input/command is an actual voice or is likely to be something other than an actual voice (e.g., a laser used to replicate a voice or the like)

The present invention relies on the assumption that when actual voice inputs are received by a device, the telemetry of the device behaves according to a known baseline and when inputs are received that attempt to replicate a voice the telemetry of the device will differ from the known baseline.

Therefore, according to embodiments of the present invention, when a voice command is received by a user device, the device compiles telemetry data and transmits the telemetry data, along with the digital signal that includes the voice command, to the voice interaction/response system. In turn, the voice interaction/response system, makes a determination, based on the received telemetry data, as to whether the received voice command is an actual voice input. The telemetry data may include thermal data associated with one or more components of the user device, such as the processing device(s) or the like. In other embodiments of the invention, the telemetry data may include other informative data such as, but not limited to, (i) power consumption data of one or more components, (ii) touch panel input data of one or more touch panels (iii) motion amount data or motion pattern data of one or more diaphragms of the at least one microphone, (iv) geo-physical location of the user device, (vi) MAC address of the user device, and (vii) time at which the perceived voice command was received at the device.

In specific embodiments of the invention, a machine learning model is developed that renders baseline telemetry data for the user device based on continual/ongoing receipt of telemetry data from the device during voice response requests. In such embodiments of the invention, when the voice interaction/response system receives a voice command and telemetry data, the telemetry data is compared to the baseline telemetry data of the machine learning model to determine the differences therebetween. In specific embodiments of the invention, the comparison results in determination of a telemetry score that indicates a level of difference between the received telemetry data and the baseline telemetry data. In such embodiments of the invention, if the telemetry score meets or is below a threshold level telemetry score, the voice command is deemed to be actual voice and the system provides a response to the command. Alternatively, if the telemetry score meets or exceeds the threshold level telemetry score, the voice command is deemed to likely not be an actual voice and actions/inactions other than providing a response are taken (e.g., an error message is provided or no response is made).

Figure 1:
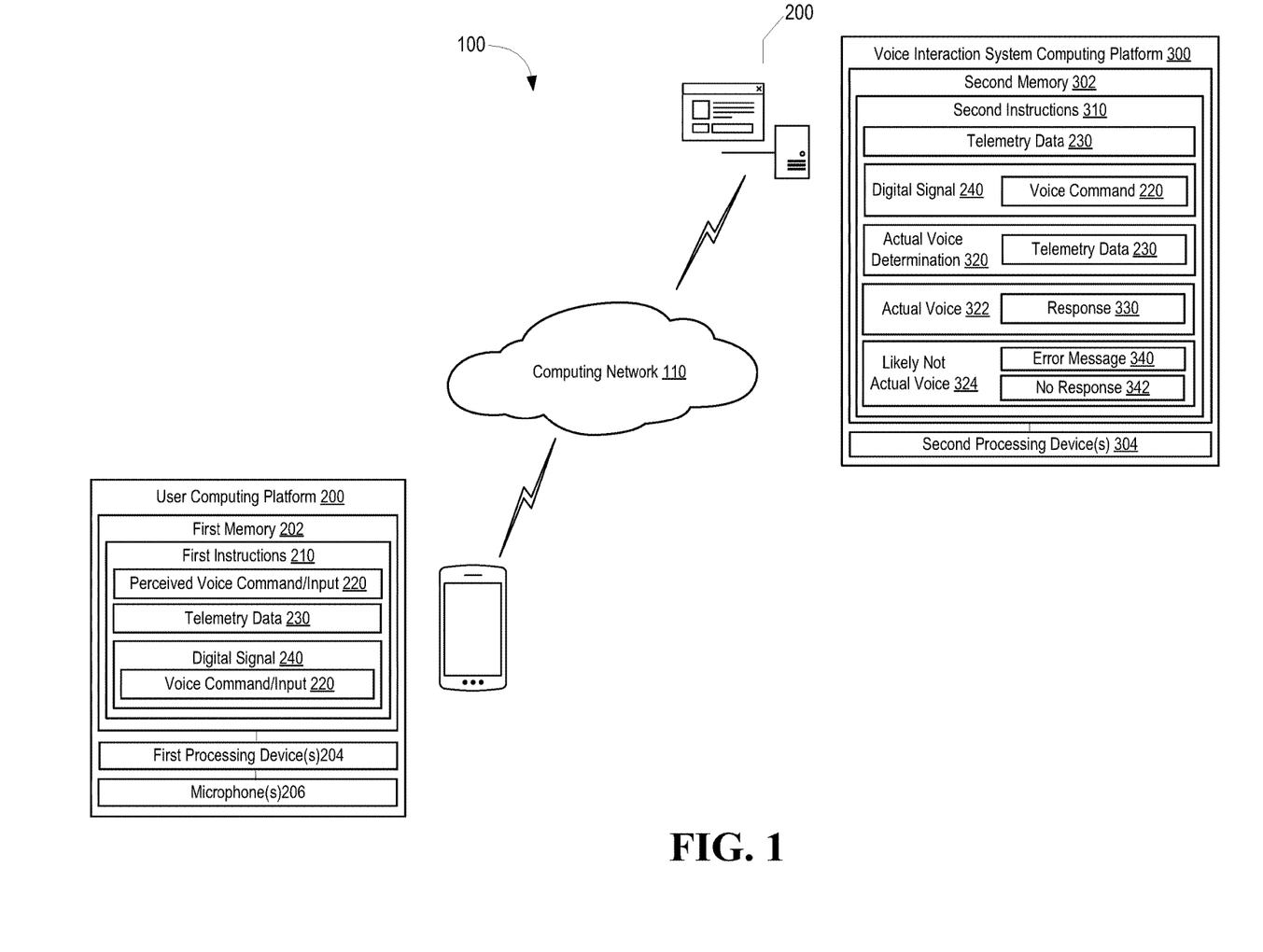
FIG. 1 is a schematic/block diagram of a system for providing protection against voice misappropriation in a voice interaction system, in accordance with embodiments of the present invention.

Referring to FIG. 1, a schematic/block diagram is presented of an exemplary system 100 for providing protection against voice misappropriation in a voice interaction/response system, in accordance with embodiments of the present invention. As depicted, the system 100 includes a user computing platform 200 and a voice interaction system computing platform 300 that are in communication via communication network 110, which may include the Internet, one or more intranets or a combination thereof.

User computing platform 200 is depicted as a mobile communication device. However, one of ordinary skill in the art will appreciate the fact that the user computing platform 200 may comprise any Internet-of-Things (IoT) device having the capability to receive voice commands (i.e., equipped with one or more microphones). User computing platform 200 includes a first memory 202 and one or more first processing devices 204 in communication with the first memory 202. Additionally, user computing platform 200 includes at least one microphone 206 that is in communication with the one or more first processing devices 204.

The first memory 202 stores first instructions 210 that are executable by the first processing device(s) 204. The first instructions 210 are configured to receive, via microphone (s) 206, a perceived voice command/input 220. The input 220 is deemed to be "perceived" as a voice command, since it is yet undetermined as to whether the voice command is made by an actual voice or is made by some other means used to replicate an actual voice (e.g., a laser or some other known or future known means for voice replication). In response to receiving the perceived voice command 220, the first instructions 210 are further configured to compile telemetry data 230 that indicates a current operating state of the user computing platform 200. Further, the first instructions 210 are configured to transmit/communicate a digital signal 240 that represents the voice command 220 and the telemetry data 230 to the voice interaction system application.

System 100 additionally includes a voice interaction system computing platform 300 having a second memory 302 and one or more second processing devices 304 in communication with second memory 302. Second memory 302 stores second instructions 310 that are executable by the second processing device(s). The second instructions 310 are configured to receive the digital signal 240 representing the voice command 220 and telemetry data 230. In response, the second instructions 310 are configured make an actual voice determination 320. In this regard, second instructions 310 are configured to determine, based on the telemetry data 230, whether the perceived voice command 220 is an actual voice command originating from a voice of a user. If the determination 320 results in the perceived voice command being an actual voice 322, second instructions 310 are configured to generate a response 330 to the command identified from the digital signal 240 and the response 330 is transmitted to the user computing platform 200 for subsequent output (e.g., audio output via a speaker(s), visual output via a display or the like). If the determination results in the perceived voice command being likely not an actual voice 324, second instructions 310 are configured to either generate and communicate an error message 340 to the user computing platform 200 or provide no response 342 at all.

Figure 2:
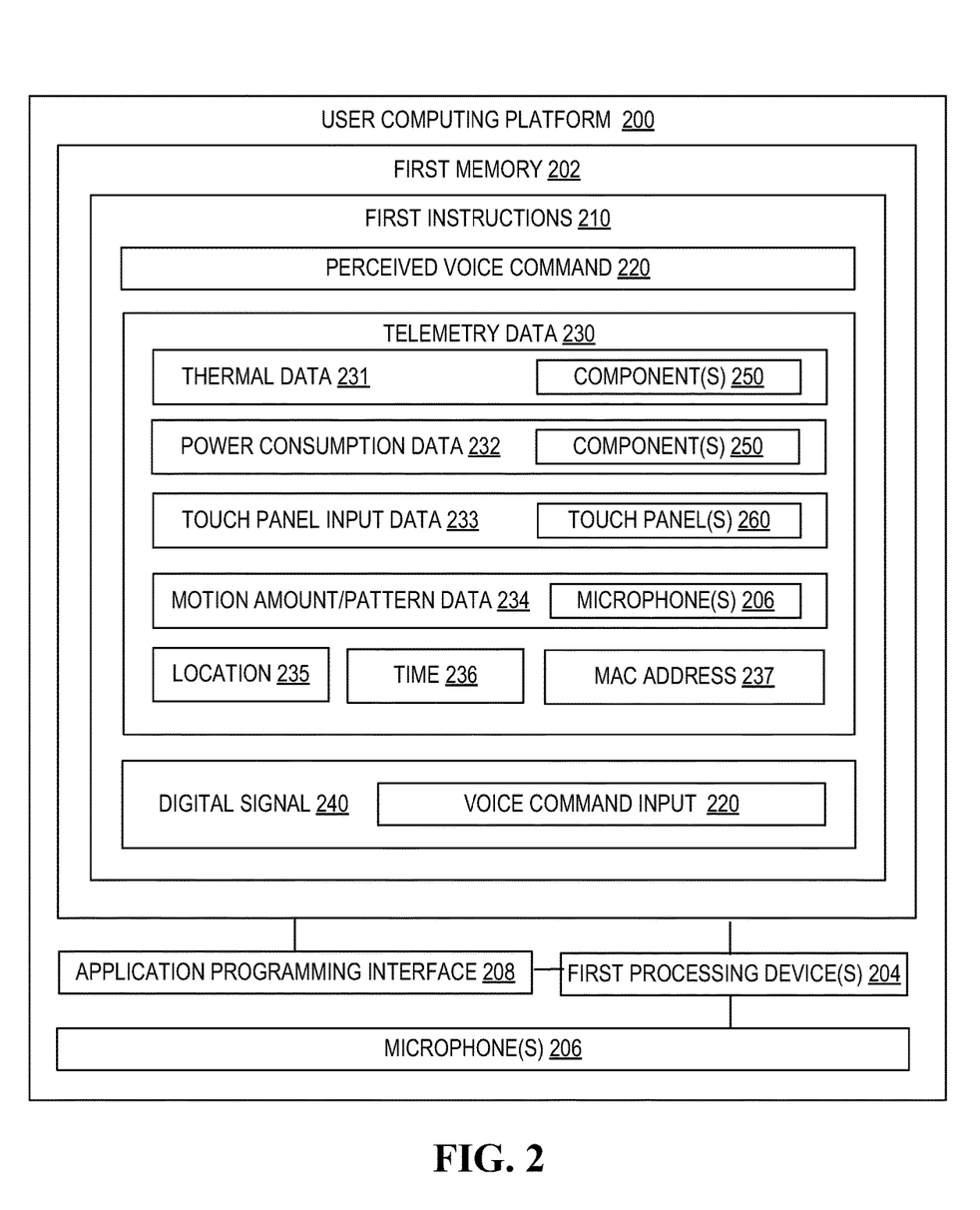
FIG. 2 is a block diagram of a user computing platform, in accordance with alternate embodiments of the present invention.

Referring to FIG. 2, a block diagram is depicted of user computing platform 200, in accordance with embodiments of the present invention. In addition to providing greater detail, FIG. 2 highlights various alternate embodiments of the system 100. User computing platform 200 comprises one or more computing devices/apparatus, such as a mobile communication device, an IoT device, a standalone voice interaction system device or the like configured to execute software programs, including instructions, engines, algorithms, modules, routines, applications, tools, and the like. User computing platform 200 includes first memory 202, which may comprise volatile and non-volatile memory, such as read-only and/or random-access memory (RAM and ROM), EPROM, EEPROM, flash cards, or any memory common to computer platforms). Moreover, first memory 202 may comprise cloud storage, such as provided by a cloud storage service and/or a cloud connection service.

Further, user computing platform 200 also includes first processing device(s) 204, which may be an application-specific integrated circuit ("ASIC"), or other chipset, logic circuit, or other data processing device. Second processing device 304 may execute an application programming interface ("API") 206 that interfaces with any resident programs, such as first instructions 210 and algorithms, sub-engines/routines associated therewith or the like stored in the first memory 202 of the user computing platform 200.

First processing device(s) 204 may include various processing subsystems (not shown in FIG. 2) embodied in hardware, firmware, software, and combinations thereof, that enable the functionality of user computing platform 200 and the operability of second computing platform 300 on a distributed communication network 110 (shown in FIG. 1). For example, processing subsystems allow for initiating and maintaining communications and exchanging data with other networked devices. For the disclosed aspects, processing subsystems of first processing device 204 may include any subsystem used in conjunction with first instructions 210 and related sub-engines/routines, algorithms, sub-algorithms, modules, sub-modules thereof.

Additionally, user computing platform 200 includes at least one microphone 206 and, optionally, at least one speaker 207, which are in communication with the first processing device(s) 204. The microphone(s) 206 are configured to receive the voice commands and, in specific embodiments of the system, the speakers 207 are configured to output a response to the voice commands.

User computing platform 200 additionally includes a communications module (not shown in FIG. 2) embodied in hardware, firmware, software, and combinations thereof, that enables electronic communications between user computing platform 200 and other networks and/or networked devices, such as, voice interaction system computing platform 300 and the like. Thus, the communication module may include the requisite hardware, firmware, software and/or combinations thereof for establishing and maintaining a network communication connection with one or more systems, platforms, networks, or the like.

As previously discussed in relation to FIG. 1, first memory 202 stores first instructions 210 that are executable by the second processing device(s) 304. The first instructions 210 are configured to receive, via microphone(s) 206, a perceived voice command/input 220. In response to receiving the perceived voice command 220, the first instructions 210 are further configured to compile telemetry data 230 that indicates a current operating state of the user computing platform 200. The telemetry data may include, but is not limited to, thermal data 231 indicating a current degrees of one or more components 250 (e.g., processing devices 204 or the like); power consumption data 232 indicating an amount and/or rate of power consumed by one or more components 250 (e.g., processing devices 204 or the like); touch panel input data 233 indicating a presence and/or location of inputs to one or more touch panels/displays 260; and motion amount/pattern data 234 indicating an amount or pattern of motion provided to diaphragms of the one or more microphones 206. Moreover, telemetry data 230 may include the geophysical location 235 of the user computing platform 200, the time 236 at which the perceived voice command 220 was received and the MAC address 237 of the user computing platform 200 or some other user computer platform-identifying data.

In response to receiving the perceived voice command 220, the first instructions 210 are configured to convert the analog perceived voice command signal to a digital signal 240. Further, the first instructions 210 are configured to transmit/communicate the digital signal 240 and the telemetry data 230 to the voice interaction system application.

In response to processing by the voice interaction system and determining that the perceived voice command 220 is an actual voice, first instructions 210 are configured to receive and output the response 330. The response 330 may be audible and outputted by speaker(s) 207 or, optionally, the response 330 may be textual and outputted via a display (not shown in FIG. 2) or the like. In response to processing by the voice interaction system and determining that the perceived voice command 220 is likely not an actual voice, first instructions 210 may be configured to receive and output error message 340. The error message 340 may be audible and outputted by speaker(s) 207 or, optionally, the response 330 may be textual and outputted via a display (not shown in FIG. 2) or the like. In other embodiments of the system, determining that the perceived voice command 220 is likely not an actual voice may result in no response. In which case first instructions 210 performs no further actions.

Figure 3:
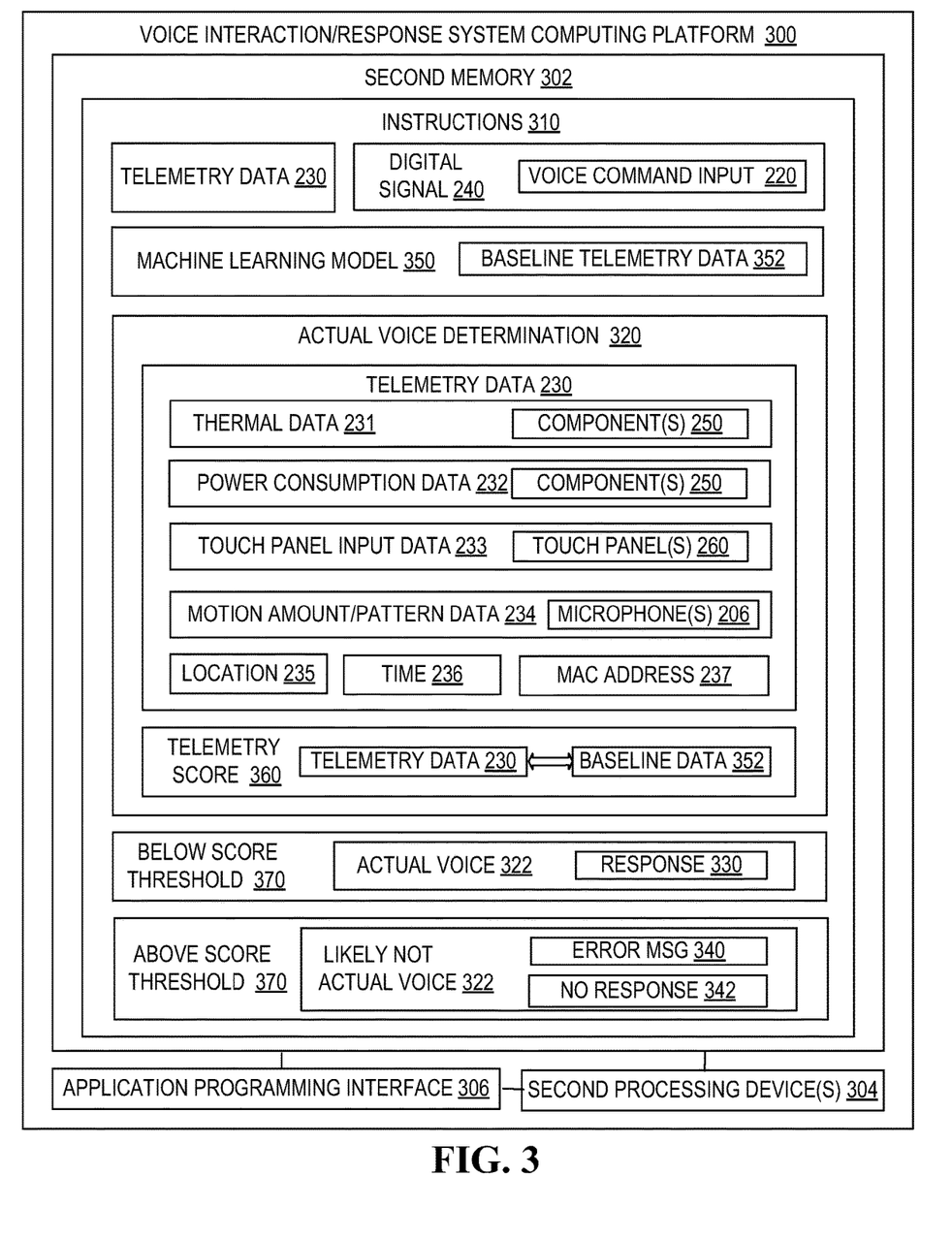
FIG. 3 is a block diagram of a voice interaction system computing platform, in accordance with alternate embodiments of the present invention.

Referring to FIG. 3, a block diagram is depicted of voice interaction system computing platform 300, in accordance with embodiments of the present invention. In addition to providing greater detail, FIG. 3 highlights various alternate embodiments of the system 100. Voice interaction system computing platform 300 comprises one or more computing devices/apparatus, such as an application server or the like configured to execute software programs, including instructions, engines, algorithms, modules, routines, applications, tools, and the like. Voice interaction system computing platform 300 includes second memory 302, which may comprise volatile and non-volatile memory, such as read-only and/or random-access memory (RAM and ROM), EPROM, EEPROM, flash cards, or any memory common to computer platforms). Moreover, second memory 302 may comprise cloud storage, such as provided by a cloud storage service and/or a cloud connection service.

Further, voice interaction system computing platform 300, also includes second processing device(s) 304, which may be an application-specific integrated circuit ("ASIC"), or other chipset, logic circuit, or other data processing device. Second processing device 304 may execute an application programming interface ("API") 306 that interfaces with any resident programs, such as second instructions 310 and algorithms, sub-engines/routines associated therewith or the like stored in the second memory 302 of the voice interaction system computing platform 300.

Second processing device(s) 304 may include various processing subsystems (not shown in FIG. 3) embodied in hardware, firmware, software, and combinations thereof, that enable the functionality of voice interaction system computing platform 300 and the operability of voice interaction system computing platform 300 on a distributed communication network 110 (shown in FIG. 1). For example, processing subsystems allow for initiating and maintaining communications and exchanging data with other networked devices. For the disclosed aspects, processing subsystems of second processing device 304 may include any subsystem used in conjunction with second instructions 310 and related sub-engines/routines, algorithms, sub-algorithms, modules, sub-modules thereof.

Voice interaction system computing platform 300 additionally includes a communications module (not shown in FIG. 3) embodied in hardware, firmware, software, and combinations thereof, that enables electronic communications between voice interaction system computing platform 300 and other networks and/or networked devices, such as, user computing platform 200 and the like. Thus, the communication module may include the requisite hardware, firmware, software and/or combinations thereof for establishing and maintaining a network communication connection with one or more systems, platforms, networks, or the like.

As previously discussed in relation to FIG. 1, second memory 302 stores second instructions 310 that are executable to the first processing device(s) 204. Second instructions 310 are configured to receive the digital signal 240 representing the voice command 220 and telemetry data 230. In response, the second instructions 310 are configured make an actual voice determination 320. In this regard, second instructions 310 are configured to determine, based on the telemetry data 230, whether the perceived voice command 220 is an actual voice command originating from a voice of a user. In specific embodiments of the invention, the telemetry data 230 includes thermal data 231 indicating the current degrees of one or more components 250 of the user computing platform 200. In such embodiments of the invention, the determination 320 of whether the perceived voice command 220 is an actual voice command may be based solely on the thermal data 231. In other embodiments of the invention, in which the telemetry data additionally includes power consumption data 232 indicating an amount and/or rate of power consumed by one or more components 250; touch panel input data 233 indicating a presence and/or location of inputs to one or more touch panels/displays 260; and motion amount/pattern data 234 indicating an amount or pattern of motion provided to diaphragms of the one or more microphones 206; the geophysical location 235 of the user computing platform 200; the time 236 at which the perceived voice command 220 was received, and the MAC address 237 of the user computing platform 200 or other telemetry data, the determination 320 of whether the perceived voice command 220 is an actual voice command may be based on the thermal data 231 along with any combination of the other specified and unspecified telemetry data.

In specific embodiments of the invention, the determination 320 of whether the perceived voice command 220 is an actual voice command relies on machine learning model 350 that is configured to determine, over time, baseline telemetry data 352 for the user computing platform 200. In this regard, the telemetry data from voice commands determined to come from actual voices serves as inputs to the machine learning model 350, which is then able to determine baseline telemetry data 352 for various conditional parameters (such as, but not limited to, user, time, location and the like). In such embodiments of the invention, second instructions 310 are configured to compare the received telemetry data 230 to the relevant baseline telemetry data 352 to determine a telemetry score 360 that indicates a level of difference between the baseline telemetry data 352 and the received telemetry data 230. In alternate embodiments of the invention, the telemetry score may indicate a level of sameness between the baseline telemetry score 352 and the received telemetry data 230.

In related specific embodiments of the invention, if second instructions 310 determines that the telemetry score 360 is below a predetermined threshold (i.e., minimal to no differences between the baseline telemetry data 352 and the received telemetry data 350), the perceived voice command 220 is deemed to have been made by an actual voice 322. In such embodiments of the invention, second instructions 310 are configured to generate a response 330 to the command identified from the digital signal 240 and the response 330 is transmitted to the user computing platform 200 for subsequent output (e.g., audio output via a speaker(s), visual output via a display or the like). Alternatively, if second instructions 310 determines that the telemetry score 360 is above the predetermined threshold (i.e., substantial differences between the baseline telemetry data 352 and the received telemetry data 350) the perceived voice command 220 is deemed to likely not be an actual voice 322. In such embodiments of the invention, second instructions 2120 are configured to either generate and communicate an error message 340 to the user computing platform 200 or provide no response 342 at all.

Figure 4:
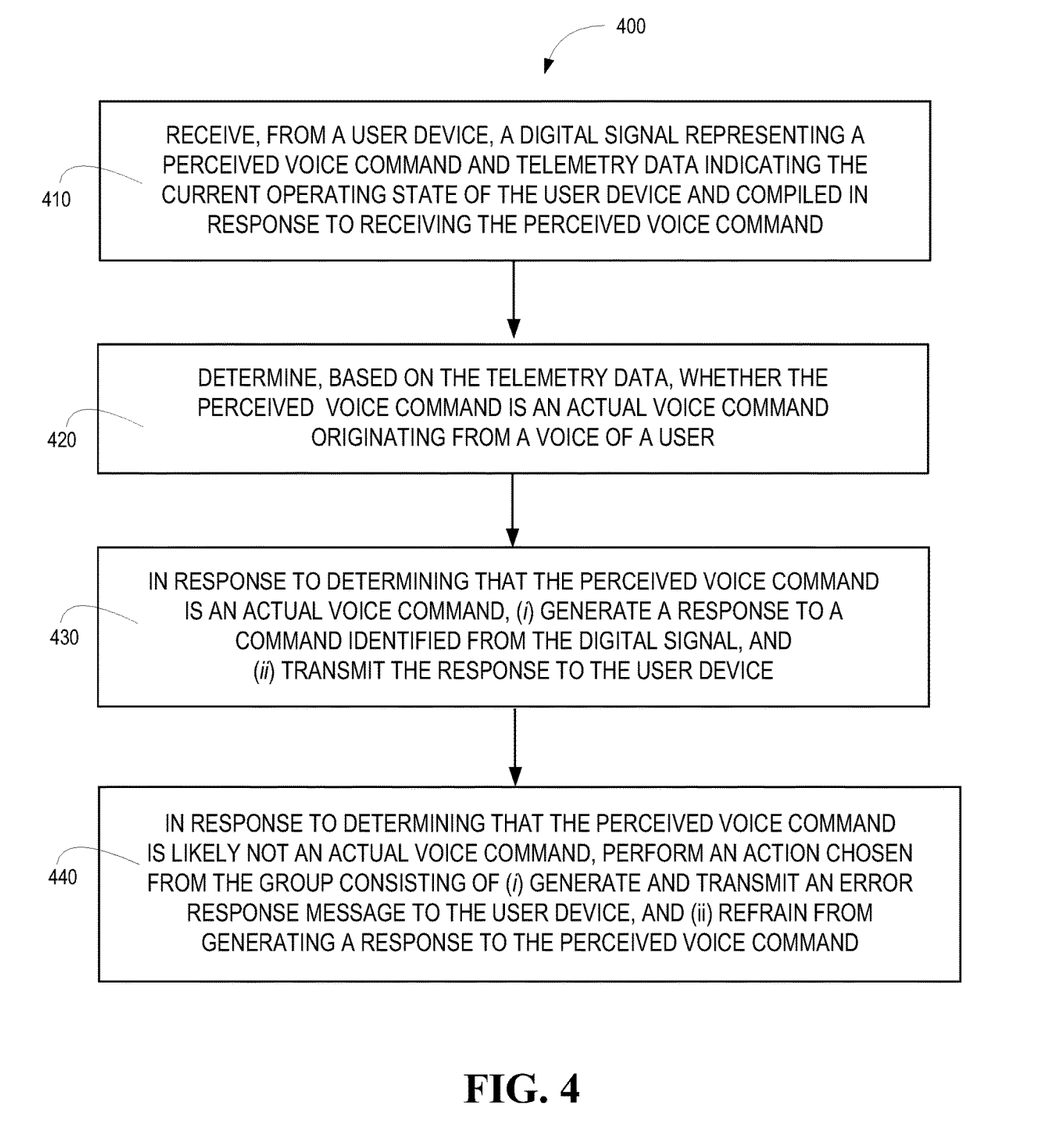
FIG. 4 is a flow diagram of a method for providing protection against voice misappropriation in a voice interaction system, in accordance with embodiments of the present invention.

Referring to FIG. 4, a flow diagram is depicted of a method 400 for providing protection against voice misappropriation, in accordance with embodiments of the present invention. At Event 410, a (i) digital signal representing a perceived voice command and (ii) telemetry data indicating the current operating state of a user device is received from the user device. As previously discussed, at a minimum the telemetry data includes thermal data indicating the current degrees of one or more components of the user device, such as processing device(s) or the like.

At Event 420, a determination is made, based on the telemetry data, as to whether the perceived voice command is an actual voice command originating from a voice of the user. As previously discussed, the perceived voice command may originate from other means, such as a laser or the like, used to nefariously replicate the voice of the user.

In response to determining that the perceived voice command is an actual voice command, at Event 430, a response to the command identified in the digital signal is generated and transmitted to the user device for subsequent output. In response to determining that the perceived voice command is likely not an actual voice command, at Event 440, an action/inaction is performed. The action may consist of generating and transmitting an error message to the user device for subsequent output. The inaction may consist of refraining from generating a response to the command (i.e., taking no action).

Figure 5:
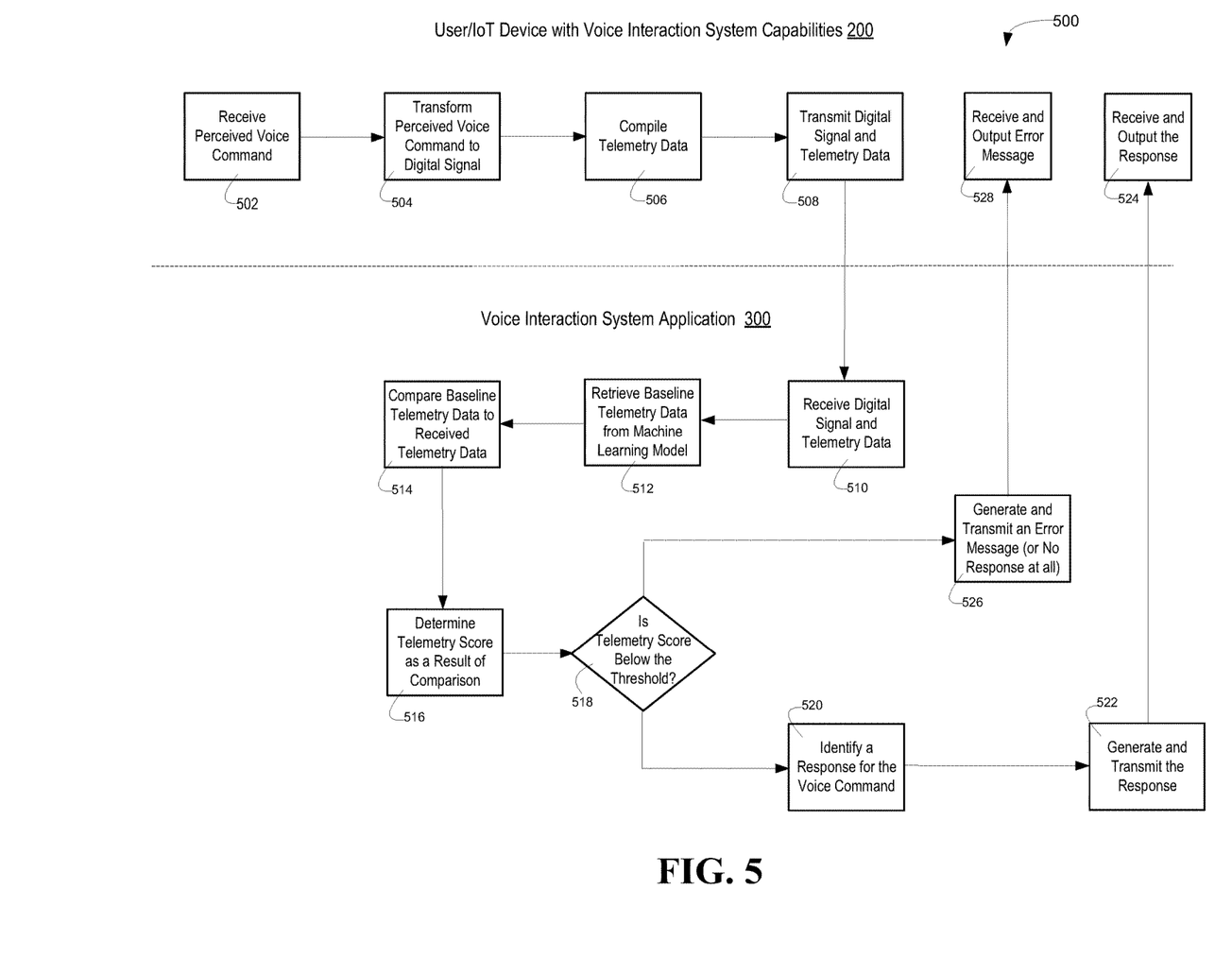
FIG. 5 is a flow diagram of a method for providing protection against voice misappropriation in a voice interaction system, in accordance with alternate embodiments of the present invention.

Referring to FIG. 4, a flow diagram is depicted of a method 500 for protecting against voice misappropriation in a voice interaction system, in accordance with embodiments of the present invention. At Event 502, a perceived voice command is received by a user device. The voice command is deemed to be "perceived" since it is yet unknown as to whether the voice command came from an actual voice or from some other means (e.g., laser) attempting to replicate a voice. The user device may be any device equipped with voice interaction system capabilities (i.e., a device that includes a microphone(s) and, in some embodiments, a speaker(s)), such as a mobile communication device, and IoT device or the like. In response to receiving the perceived voice command, at Event 504, the command is transformed into a digital signal and, at Event 506, telemetry data is compiled from the user device. The telemetry data may include but is not limited to, thermal data indicating current degrees of one or more user device components (e.g., processing device(s) or the like), power consumption data of one or more user device components, touch panel input data of a user device touch panel(s), motion amount/pattern data of diaphragms of user device microphone(s), geo-physical location of the user device, MAC address of the user device, and time at which the perceived voice command was received at the user device. At Event 508. The digital signal representing the voice command and the telemetry data are transmitted to the voice interaction system application.

At Event 510, the voice interaction system application receives the digital signal and the telemetry data. In response to receipt of the digital signal and telemetry data, at Event 512, baseline telemetry data is retrieved from a machine learning model. The baseline telemetry data that is received may be specific to a time of day, user, location or the like. The baseline telemetry data indicates typical telemetry state of the user device when receiving an actual voice command from a user. At Event, 514 the baseline telemetry data is compared to the received telemetry data to determine the differences therebetween and, at Event 516 a telemetry score is determined based on a level of differences between the baseline telemetry data and the received telemetry data. In alternate embodiments of the invention, the telemetry score may indicate a level of sameness between the baseline telemetry data and the received telemetry data.

At Decision 518, a determination is made as to whether the telemetry score, indicating a level of differences between the baseline and received telemetry data, is below a predetermined threshold. The predetermined threshold is established such that scores below the threshold indicate that the voice command came from an actual voice and scores above the threshold indicate that the voice command likely came from something other than an actual voice (i.e., a laser or the like replicating an actual voice). If the determination results in the telemetry score being below the threshold, at Event 520 a response to the command represented in the digital signal is identified and, at Event 522, the response is generated and transmitted to the user device. If the determination results in the telemetry score being below the threshold, at Event 526, an error message is generated and transmitted to the user device. Alternatively, if the determination results in the telemetry score being below the threshold, no response at all is generated or transmitted to the user device (i.e., the voice command is ignored). It should be noted that in the event that the telemetry score is determined to be below the threshold (i.e., likely not an actual voice), it still may beneficial for the voice response system to process the digital signal and determine the command as a means of determining the purpose behind the voice replicator's actions.

In response to the voice interaction system application transmitting the response, at Event 524, the user device receives and outputs the response (e.g., provides audible signal via the speaker(s), textual content via display or the like). Alternatively, in response to the voice interaction system application transmitting the error message, the user device receives and outputs the error message (e.g., provides audible signal via the speaker(s), textual content via display or the like), Thus, as described in detail above, present embodiments of the invention include systems, methods, computer program products and/or the like for protection against misappropriation of voice in a voice interaction/response system. In this regard, the present invention is able to determine whether a voice input/command is an actual voice or is likely to be something other than an actual voice. The invention relies on telemetry data of the device, which is compiled at the time of receipt of the voice command. The telemetry data is compared to known baseline telemetry of the device to determine a level of differences between the telemetry data and the known baseline telemetry.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for protection against voice misappropriation in a voice interaction system, the system comprising:
a user computing platform including a first memory, one or more first processing devices in communication with the first memory, at least one microphone in communication with at least one of the first processing devices, and at least one touch panel in communication with at least one of the processing devices, wherein the first memory stores first instructions that are executable by the one or more first processing devices and configured to cause the one or more first processing devices to:
receive, via the at least one microphone, a perceived voice command,
in response to receiving the perceived voice command, compile telemetry data that indicates a current operating state of the user computing platform, wherein the telemetry data comprises two or more of: (i) power consumption data of one or more components of the user computing platform, (ii) touch panel input data from that at least one touch panel, and (iii) motion data from one or more diaphragms of the at least one microphone,
transmit a digital signal representing the perceived voice command and the telemetry data to the voice interaction system; and
a voice interaction system computing platform including a second memory and one or more second processing devices in communication with the second memory, wherein the second memory stores second instructions that are included within the voice interaction system, executable by the one or more second processing devices and configured to cause the one or more second processing devices to:
receive, from the user computing platform, the digital signal and the telemetry data,
determine, based on the telemetry data including the two or more of the power consumption data, the touch panel input data and the motion data, whether the perceived voice command is an actual voice command originating from a voice of a user,
in response to determining that the perceived voice command input is the actual voice command:
generate a response to a command identified from the digital signal, and
transmit the response to the user computing platform.

2. The system of claim 1, wherein the first instructions further comprise instructions configured to cause the one or more first processing devices to compile the telemetry data that indicates a current operating state of the user computing platform, wherein the telemetry data further includes thermal data of one or more components of the user computing platform.

3. The system of claim 1, wherein second instructions further comprise instruction to cause the one or more second processing devices to:
in response to determining that the perceived voice command is likely not the actual voice command, perform an action chosen from the group consisting of (i) generate and transmit an error response to the user computing platform, and (ii) refrain from generating a response to the perceived voice command.

4. The system of claim 1, wherein the telemetry data comprises (i) power consumption data of one or more components of the user computing platform, (ii) touch panel input data from that at least one touch panel, and (iii) motion data from one or more diaphragms of the at least one microphone.

5. The system of claim 2, wherein the first instructions further comprise instructions to cause the one or more first processing devices to compile the telemetry data that indicates a current operating state of the user computing platform, wherein the telemetry data includes the motion data, wherein the motion data is further defined as at least one of motion amount data or motion pattern data of the one or more diaphragms of the at least one microphone.

6. The system of claim 2, wherein the first instructions further comprise instructions to cause the one or more first processing devices to compile the telemetry data that indicates a current operating state of the user computing platform, wherein the telemetry data further includes location of the user computing platform.

7. The system of claim 2, wherein the first instructions further comprise instructions to cause the one or more first processing devices to compile the telemetry data that indicates a current operating state of the user computing platform, wherein the telemetry data further includes one or more of MAC addresses of the user device, and time at which the perceived voice command was received at the device.

8. The system of claim 1, wherein the second computing platform further comprises third instructions configured to cause the one or more second processing devices to:
develop a machine learning model that determines baseline telemetry data for the user computing platform based on ongoing receipt of telemetry data from the user computing platform.

9. The system of claim 8, wherein the second instructions further comprise instructions to cause the one or more second processing devices to determine whether the perceived voice command is an actual voice command originating from a voice of a user are further configured to:

compare the received telemetry data to the baseline telemetry data determined from machine learning model, based on the comparison, determine a telemetry score that indicates a level of difference between the received telemetry data and the baseline telemetry data, and in response to determining that the telemetry score meets or is below a predetermined threshold, identify the perceived voice command as the actual voice command.

10. The system of claim 9, wherein the second instructions further comprise instructions to cause the one or more second processing devices to determine whether the perceived voice command is an actual voice command originating from a voice of a user are further configured to:

in response to determining that the telemetry score exceeds the predetermined threshold, identify the perceived voice command as likely not the actual voice command.

11. A computer-implemented method for protection against voice misappropriation in a voice interaction system, the computer-implemented method is executable by one or more computing processor devices, the method comprising:

receiving, from a user device, a digital signal representing a perceived voice command received at user device and telemetry data compiled in response to receiving the perceived voice command, wherein the telemetry data indicates a current operating state of the user device and comprises two or more of (i) power consumption data of one or more components of the user computing platform, (ii) touch panel input data from that at least one touch panel, and (iii) motion data from one or more diaphragms of the at least one microphone;

determining, based on the telemetry data including the two or more of the power consumption data, the touch panel input data and the motion data, whether the perceived voice command is an actual voice command originating from a voice of a user; and in response to determining that the perceived voice command input is the actual voice command generating a response to a command identified from the digital signal, and transmitting the response to the user device.

12. The computer-implemented method of claim 11, wherein receiving the digital signal representing the perceived voice command and the telemetry data further comprises receiving telemetry data, wherein the telemetry further includes thermal data of one or more components of the user computing platform.

13. The computer-implemented method of claim 11 further comprising:

in response to determining that the perceived voice command is likely not the actual voice command, performing an action chosen from the group consisting of (a) generating and transmitting an error response to the user device, and (b) refraining from generating a response to the perceived voice command.

14. The computer-implemented method of claim 12, wherein receiving the digital signal representing the perceived voice command and the telemetry data further comprises receiving telemetry data including one or more of location of the user device, MAC address of the user device, and time at which the perceived voice command was received at the device.

15. The computer-implemented method of claim 11, wherein determining, based on the telemetry data, whether the perceived voice command is an actual voice command originating from a voice of a user further comprises:

developing a machine learning model that determines baseline telemetry data for the user computing platform based on ongoing receipt of telemetry data from the user computing platform;

comparing the received telemetry data to the baseline telemetry data determined from machine learning model;

based on the comparison, determining a telemetry score that indicates a level of difference between the received telemetry data and the baseline telemetry data; and in response to determining that the telemetry score meets or is below a predetermined threshold, identifying the perceived voice command as the actual voice command, or in response to determining that the telemetry score exceeds the predetermined threshold, identifying the perceived voice command as likely not the actual voice command.

16. A computer program product including a non-transitory computer-readable medium, the non-transitory computer-readable medium comprising:

a first set of codes for causing a computer to receive, from a user device, a digital signal representing a perceived voice command received at user device and telemetry data compiled in response to receiving the perceived voice command, wherein the telemetry data indicates a current operating state of the user device and comprises two or more of (i) power consumption data of one or more components of the user computing platform, (ii) touch panel input data from that at least one touch panel, and (iii) motion data from one or more diaphragms of the at least one microphone;

a second set of codes for causing a computer to determine, based on the telemetry data including the two or more of the power consumption data, the touch panel input data and the motion data, whether the perceived voice command is an actual voice command originating from a voice of a user; and a third set of codes for causing a computer to in response to determining that the perceived voice command input is the actual voice command generate a response to a command identified from the digital signal, and transmit the response to the user device.

17. The computer program product of claim 16, wherein the first set of codes is further configured to receive the telemetry data, wherein the telemetry further includes thermal data of one or more components of the user computing platform.

18. The computer program product of claim 16, wherein the third set of codes further comprises coded for causing a computer to in response to determining that the perceived voice command is likely not the actual voice command, perform an action chosen from the group consisting of generate and transmit an error response to the user device, or refrain from generating a response to the perceived voice command.

19. The computer program product of claim 17, wherein the first set of codes is further configured to receive the telemetry data including one or more of location of the user device MAC address of the user device, and time at which the perceived voice command was received at the device.

20. The computer program product of claim 16, wherein the second set of codes is further configured to determine, based on the telemetry data, whether the perceived voice command is an actual voice command originating from a voice of a user by:

developing a machine learning model that determines baseline telemetry data for the user computing platform based on ongoing receipt of telemetry data from the user computing platform;

comparing the received telemetry data to the baseline telemetry data determined from machine learning model;

based on the comparison, determining a telemetry score that indicates a level of difference between the received telemetry data and the baseline telemetry data; and in response to determining that the telemetry score meets or is below a predetermined threshold, identifying the perceived voice command as the actual voice command, or in response to determining that the telemetry score exceeds the predetermined threshold, identifying the perceived voice command as likely not the actual voice command.

* * * * *